(12) United States Patent
He et al.

(10) Patent No.: US 12,083,856 B2
(45) Date of Patent: Sep. 10, 2024

(54) INTEGRATED THERMAL MANAGEMENT SYSTEM FOR A VEHICLE

(71) Applicant: Rivian IP Holdings, LLC, Plymouth, MI (US)

(72) Inventors: Jing He, Novi, MI (US); Henry Huang, Ann Arbor, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 263 days.

(21) Appl. No.: 17/083,937

(22) Filed: Oct. 29, 2020

(65) Prior Publication Data
US 2022/0134839 A1    May 5, 2022

(51) Int. Cl.
*B60H 1/00* (2006.01)
*B60H 1/14* (2006.01)
(Continued)

(52) U.S. Cl.
CPC ..... *B60H 1/00392* (2013.01); *B60H 1/00007* (2013.01); *B60H 1/00271* (2013.01); *B60H 1/00278* (2013.01); *B60H 1/00485* (2013.01); *B60H 1/00764* (2013.01); *B60H 1/00885* (2013.01); *B60H 1/00899* (2013.01);
(Continued)

(58) Field of Classification Search
CPC ............ B60H 1/00392; B60H 1/00007; B60H 1/00278; B60H 1/00485; B60H 1/00764; B60H 1/00899; B60H 1/22; B60H 1/3204; B60H 1/00321; B60H 1/00271; B60H 1/00885; B60H 1/143; B60H 2001/003; B60H 2001/00935; B60H 2001/00307; B60K 1/00; B60K 2001/005;
(Continued)

(56) References Cited

U.S. PATENT DOCUMENTS

| | | | | |
|---|---|---|---|---|
| 4,691,532 A | * | 9/1987 | Reid | F25B 29/006 |
| | | | | 62/476 |
| 4,719,767 A | * | 1/1988 | Reid, Jr. | F25B 47/003 |
| | | | | 62/476 |

(Continued)

FOREIGN PATENT DOCUMENTS

| | | |
|---|---|---|
| CN | 109318700 A | 2/2019 |
| CN | 110509744 A | 11/2019 |

(Continued)

OTHER PUBLICATIONS

Sep. 27, 2023 First Office Action issued in Corresponding International Application No. 202111077099.1.

*Primary Examiner* — Ljiljana V. Ciric
(74) *Attorney, Agent, or Firm* — Haley Guiliano LLP

(57) ABSTRACT

An integrated thermal management system, method, and non-transitory computer readable medium for a vehicle, including a cabin thermal management loop; an energy storage system thermal management loop; a power electronics thermal management loop; and a multi-port valve assembly coupled to the cabin thermal management loop, the energy storage system thermal management loop, and the power electronics thermal management loop, adapted to, responsive to an operating state of the vehicle, selectively isolate and couple the cabin thermal management loop, the energy storage system thermal management loop, and the power electronics thermal management loop from and to one another.

18 Claims, 13 Drawing Sheets

(51) Int. Cl.
*B60H 1/22* (2006.01)
*B60H 1/32* (2006.01)

(52) U.S. Cl.
CPC .............. *B60H 1/143* (2013.01); *B60H 1/22* (2013.01); *B60H 1/3204* (2013.01); *B60H 2001/003* (2013.01); *B60H 2001/00307* (2013.01); *B60H 2001/00935* (2013.01); *Y02T 10/70* (2013.01)

(58) Field of Classification Search
CPC .......... B60K 2001/006; H05K 7/2029; H05K 7/20318; H05K 7/20381; Y02T 10/70
See application file for complete search history.

(56) References Cited

U.S. PATENT DOCUMENTS

| | | | | |
|---|---|---|---|---|
| 5,537,956 | A * | 7/1996 | Rennfeld | B60L 3/0061 123/41.31 |
| 5,794,437 | A * | 8/1998 | Lisniansky | F03C 1/003 60/451 |
| 5,794,439 | A * | 8/1998 | Lisniansky | F03C 1/003 60/451 |
| 6,295,819 | B1 * | 10/2001 | Mathiprakasam | F25B 21/02 62/3.5 |
| 6,477,906 | B1 * | 11/2002 | Peterson | G01N 1/26 73/864.34 |
| 6,902,937 | B2 * | 6/2005 | Vanatta | G01N 30/96 436/171 |
| 7,789,176 | B2 * | 9/2010 | Zhou | B60L 58/26 180/65.1 |
| 7,841,431 | B2 * | 11/2010 | Zhou | B60H 1/00278 180/65.1 |
| 8,336,319 | B2 * | 12/2012 | Johnston | B60L 3/0046 62/434 |
| 8,402,776 | B2 * | 3/2013 | Johnston | B60L 58/26 62/79 |
| 8,448,696 | B2 * | 5/2013 | Johnston | B60L 58/26 165/917 |
| 8,661,804 | B2 * | 3/2014 | Wagner | F04B 49/12 60/452 |
| 9,500,299 | B2 * | 11/2016 | Morein | F16K 11/0876 |
| 9,566,537 | B2 * | 2/2017 | Geng | B01D 15/1878 |
| 9,604,627 | B2 * | 3/2017 | Yamanaka | B60K 1/04 |
| 9,643,469 | B2 * | 5/2017 | Kakehashi | H01M 10/625 |
| 9,650,940 | B2 * | 5/2017 | Kakehashi | B60K 6/22 |
| 9,677,717 | B2 * | 6/2017 | Jenks | F16K 11/0873 |
| 10,035,404 | B2 * | 7/2018 | Patel | B60H 1/00885 |
| 10,065,478 | B2 * | 9/2018 | Makihara | B60K 11/02 |
| 10,183,548 | B2 * | 1/2019 | Enomoto | B60H 1/00485 |
| 10,344,877 | B2 * | 7/2019 | Roche | B60L 58/26 |
| 10,369,866 | B2 * | 8/2019 | Yamanaka | B60H 1/00278 |
| 10,371,420 | B2 * | 8/2019 | Katoh | B60H 1/00899 |
| 10,391,834 | B2 * | 8/2019 | Enomoto | F25B 25/005 |
| 10,703,172 | B2 * | 7/2020 | Makihara | F01P 7/165 |
| 10,711,576 | B2 * | 7/2020 | Bishop | E21B 7/022 |
| 10,711,903 | B2 * | 7/2020 | Coretto | F16K 3/316 |
| 10,845,099 | B2 * | 11/2020 | Nishiyama | F25B 39/028 |
| 10,883,666 | B2 * | 1/2021 | Jenks | F17D 3/00 |
| 11,052,722 | B2 * | 7/2021 | Haug | F25B 25/005 |
| 11,072,259 | B2 * | 7/2021 | Gonze | B60H 1/00385 |
| 11,181,238 | B2 * | 11/2021 | Jenks | F17D 3/00 |
| 11,207,939 | B2 * | 12/2021 | Johnston | B60H 1/00885 |
| 11,247,528 | B2 * | 2/2022 | Han | F16K 11/072 |
| 11,333,095 | B1 * | 5/2022 | Dudar | F02D 41/004 |
| 11,365,914 | B2 * | 6/2022 | Tanaka | F25B 13/00 |
| 11,433,738 | B2 * | 9/2022 | Groen | B60H 1/3211 |
| 11,446,979 | B2 * | 9/2022 | He | B60H 1/00278 |
| 11,454,330 | B1 * | 9/2022 | Gray | F16K 27/065 |
| 11,480,093 | B1 * | 10/2022 | Bewermeyer | B60K 11/02 |
| 11,506,026 | B2 * | 11/2022 | Bishop | E21B 43/26 |
| 11,577,619 | B2 * | 2/2023 | He | B60H 1/00428 |
| 2005/0019216 | A1 * | 1/2005 | Trutnau | G01N 21/553 422/81 |
| 2005/0167169 | A1 | 8/2005 | Gering et al. | |
| 2006/0113136 | A1 * | 6/2006 | Donaldson | B60K 17/356 180/242 |
| 2006/0118066 | A1 * | 6/2006 | Martins | F16K 11/0856 123/41.08 |
| 2010/0012295 | A1 * | 1/2010 | Nemesh | H01M 10/6568 165/104.19 |
| 2012/0304674 | A1 * | 12/2012 | Schwarzkopf | B60H 1/00878 62/238.1 |
| 2013/0061627 | A1 * | 3/2013 | Neumeister | B60L 58/27 165/96 |
| 2015/0129161 | A1 * | 5/2015 | Nishikawa | B60H 1/00885 62/243 |
| 2015/0258875 | A1 * | 9/2015 | Enomoto | B60L 58/24 165/104.31 |
| 2016/0107505 | A1 * | 4/2016 | Johnston | B60H 1/00278 165/202 |
| 2016/0178253 | A1 * | 6/2016 | Katoh | F25B 49/02 62/185 |
| 2016/0318499 | A1 * | 11/2016 | Yamanaka | B60L 58/27 |
| 2016/0339767 | A1 * | 11/2016 | Enomoto | F25B 25/005 |
| 2016/0344075 | A1 * | 11/2016 | Blatchley | B60W 10/30 |
| 2017/0008373 | A1 * | 1/2017 | Makihara | B60H 1/00828 |
| 2017/0297407 | A1 * | 10/2017 | Shan | B60H 1/00278 |
| 2018/0264913 | A1 * | 9/2018 | Enomoto | B60H 1/32284 |
| 2021/0188043 | A1 * | 6/2021 | Smith | B60H 1/00278 |
| 2021/0252940 | A1 * | 8/2021 | Heyl | B60H 1/26 |
| 2021/0323381 | A1 * | 10/2021 | Orihashi | B60H 1/00485 |
| 2021/0370748 | A1 * | 12/2021 | Groen | B60H 1/3211 |
| 2022/0090815 | A1 * | 3/2022 | Honda | F25B 49/02 |
| 2022/0134839 | A1 * | 5/2022 | He | B60H 1/00485 165/203 |
| 2022/0186840 | A1 * | 6/2022 | Kimura | B60H 1/00485 |
| 2022/0228539 | A1 * | 7/2022 | Dudar | F02D 41/004 |
| 2022/0396118 | A1 * | 12/2022 | He | B60H 1/00899 |
| 2023/0034110 | A1 * | 2/2023 | Huang | B60L 58/27 |
| 2023/0166233 | A1 * | 6/2023 | Deck | B01L 3/502738 568/405 |
| 2023/0341158 | A1 * | 10/2023 | Yu | F25B 41/26 |

FOREIGN PATENT DOCUMENTS

| | | |
|---|---|---|
| CN | 110816199 A | 2/2020 |
| CN | 111727127 A | 9/2020 |
| WO | WO-2022242764 A1 * | 11/2022 |

* cited by examiner

INTEGRATED THERMAL MANAGEMENT SYSTEM FOR A VEHICLE

TECHNICAL FIELD

The present disclosure relates generally to the automotive field. More particularly, the present disclosure relates to an integrated thermal management system (ITMS) for a vehicle, such as an electric vehicle (EV).

BACKGROUND

Cabin climate control, the management of an energy storage system (ESS) (i.e., a battery), and the cooling of power electronics are often handled with a limited degree of integration in conventional architectures in EVs. Such conventional architectures yield a very inefficient system and can pose challenges under certain operating conditions.

The present background is provided as illustrative environmental context only and should not be construed as being limiting in any manner. The principles of the present disclosure may be applied in other environmental contexts equally.

SUMMARY

The present disclosure provides such an ITMS to manage energy transfer in a more efficient and holistic manner among the cabin, ESS, and power electronics, thereby enabling cost competitive and comprehensive modes to handle varied operating conditions and effective use of a heat pump. The ITMS of the present disclosure utilizes a multi-port valve assembly, such as a six-port valve assembly with three inlets and three outlets or two four-port valve assemblies each with two inlets and two outlets, to selectively interconnect a cabin thermal management loop, an ESS thermal management loop, and a power electronics loop.

In one illustrative embodiment, the present disclosure provides an integrated thermal management system for a vehicle, including: a cabin thermal management loop; an energy storage system thermal management loop; a power electronics thermal management loop; and a multi-port valve assembly coupled to the cabin thermal management loop, the energy storage system thermal management loop, and the power electronics thermal management loop and adapted to, responsive to an operating state of the vehicle, selectively isolate and couple the cabin thermal management loop, the energy storage system thermal management loop, and the power electronics thermal management loop from and to one another.

In another illustrative embodiment, the present disclosure provides an integrated thermal management method for a vehicle, including: responsive to an operating state of the vehicle, selectively isolating and coupling a cabin thermal management loop of the vehicle, an energy storage system thermal management loop of the vehicle, and a power electronics thermal management loop of the vehicle from and to one another using a multi-port valve assembly coupled to the cabin thermal management loop, the energy storage system thermal management loop, and the power electronics thermal management loop.

In a further exemplary embodiment, the present disclosure provides a non-transitory computer readable medium stored in a memory and executed by a processor to carry out the integrated thermal management method steps, including: responsive to an operating state of a vehicle, selectively isolating and coupling a cabin thermal management loop of the vehicle, an energy storage system thermal management loop of the vehicle, and a power electronics thermal management loop of the vehicle from and to one another using a multi-port valve assembly coupled to the cabin thermal management loop, the energy storage system thermal management loop, and the power electronics thermal management loop.

Responsive to the operating state of the vehicle, the multi-port valve assembly is operated in one of the following modes: a first mode isolating the cabin thermal management loop, the energy storage system thermal management loop, and the power electronics thermal management loop from one another; a second mode isolating the cabin thermal management loop and coupling the energy storage system thermal management loop and the power electronics thermal management loop to one another; a third mode coupling the cabin thermal management loop and the energy storage system thermal management loop to one another and isolating the power electronics thermal management loop; a fourth mode coupling the cabin thermal management loop, the energy storage system thermal management loop, and the power electronics thermal management loop to one another; and a fifth mode (which is a specific embodiment of the fourth mode) coupling the cabin thermal management loop, the energy storage system thermal management loop, and the power electronics thermal management loop to one another, wherein the energy storage system thermal management loop includes a chiller, the cabin thermal management loop includes a water-cooled condenser, and the integrated thermal management system is part of a heat pump system.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF ILLUSTRATIVE EMBODIMENTS

Again, cabin climate control, the management of an ESS (i.e., a battery), and the cooling of power electronics are often handled with a limited degree of integration in conventional architectures in EVs. For example, cabin heating is often provided by a stand-alone high-voltage electrical heater with no ability to utilize the heat from the ESS or power electronics; battery heating is often provided by a dedicated electrical heater or the power electronics (e.g., by running the electric motor inefficiently) with no ability to utilize heat from the cabin refrigerant system; the power electronics can only be cooled by air via radiator, not by the cabin refrigerant system via a chiller. Such conventional architectures yield a very inefficient system and can pose challenges under certain operating conditions, e.g., battery charging in extremely cold ambient conditions (below −20° C.), or during off-road operation where power electronics can become hot and require high-load cooling. With the rapid advance in the electrification of vehicles, an ITMS is desired to manage energy transfer among the cabin, ESS, and power electronics in a holistic manner for enhanced efficiency and capability.

The present disclosure provides an ITMS to manage energy transfer in a more efficient and holistic manner among the cabin, ESS, and power electronics, thereby enabling cost competitive and comprehensive modes to handle varied operating conditions and effective use of a heat pump. The ITMS of the present disclosure utilizes a multi-port valve assembly, such as a six-port valve assembly with three inlets and three outlets or two four-port valve assemblies each with two inlets and two outlets, to selectively interconnect a cabin thermal management loop, an ESS thermal management loop, and a power electronics loop.

Figure 1:
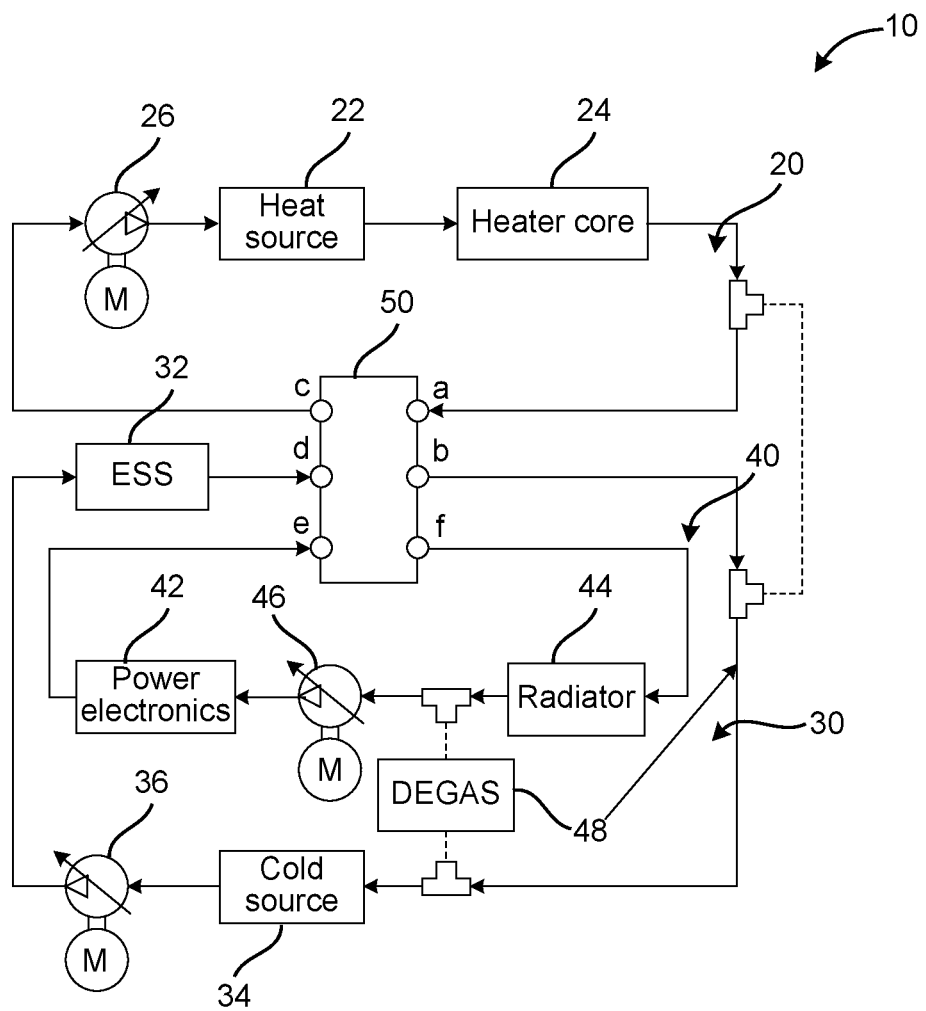
FIG. 1 is a schematic diagram of one illustrative embodiment of the ITMS of the present disclosure, utilizing a six-port valve assembly with three inlets and three outlets.

Referring now specifically to FIG. 1, in one illustrative embodiment, the ITMS 10 of the present disclosure includes three selectively interconnected thermal management loops: a cabin thermal management loop 20, an ESS thermal management loop 30, and a power electronics loop 40. These thermal management loops are selectively interconnected by a multi-port valve assembly 50, which here includes a six-port valve assembly with three inlets, a, d, and e, and three outlets, c, b, and f.

The cabin thermal management loop 20 generally includes a heating assembly such as a heat source 22, which may include a coolant heater, a water-cooled condenser, a hot thermal storage unit, or a combination of two or more of the aforementioned sources, and a heating assembly such as a heat exchanger 24, which may include a heater core, conventionally associated with an internal combustion engine (ICE). A pump assembly 26 is also provided. Collectively, the heat source 22, the heat exchanger 24, and the pump assembly 26 are operable for controlling the environment associated with the cabin of a vehicle.

The ESS thermal management loop 30 generally includes the ESS 32, such as a battery or battery pack, and a cold source 34, such as a chiller or cold thermal storage unit. A pump assembly 36 is also provided. Collectively, the ESS 32, the cold source 34, and the pump assembly 36 are operable for controlling the environment associated with the ESS 32.

The power electronics thermal management loop 40 generally includes the power electronics 42, such as motors, inverters/converters, sensors, control systems, and other interface electronics, and a radiator 44, conventionally associated with an ICE. A pump assembly 46 is also provided. Collectively, the power electronics 42, the radiator 44, and the pump assembly 46 are operable for controlling the environment associated with the power electronics 42. A degas assembly 48 includes a degas bottle and associated hoses and tee junctions that provide coolant storage and a deaeration function among the cabin thermal management loop 20, the ESS thermal management loop 30, and the power electronics thermal management loop 40.

Again, these thermal management loops are selectively interconnected by the multi-port valve assembly 50, which here includes a six-port valve assembly with three inlets, a, d, and e, and three outlets, c, b, and f. These inlets and outlets are selectively enabled/disabled, either by mechanical or electronic means, such as by software, firmware, and/or hardware means.

Figure 2:
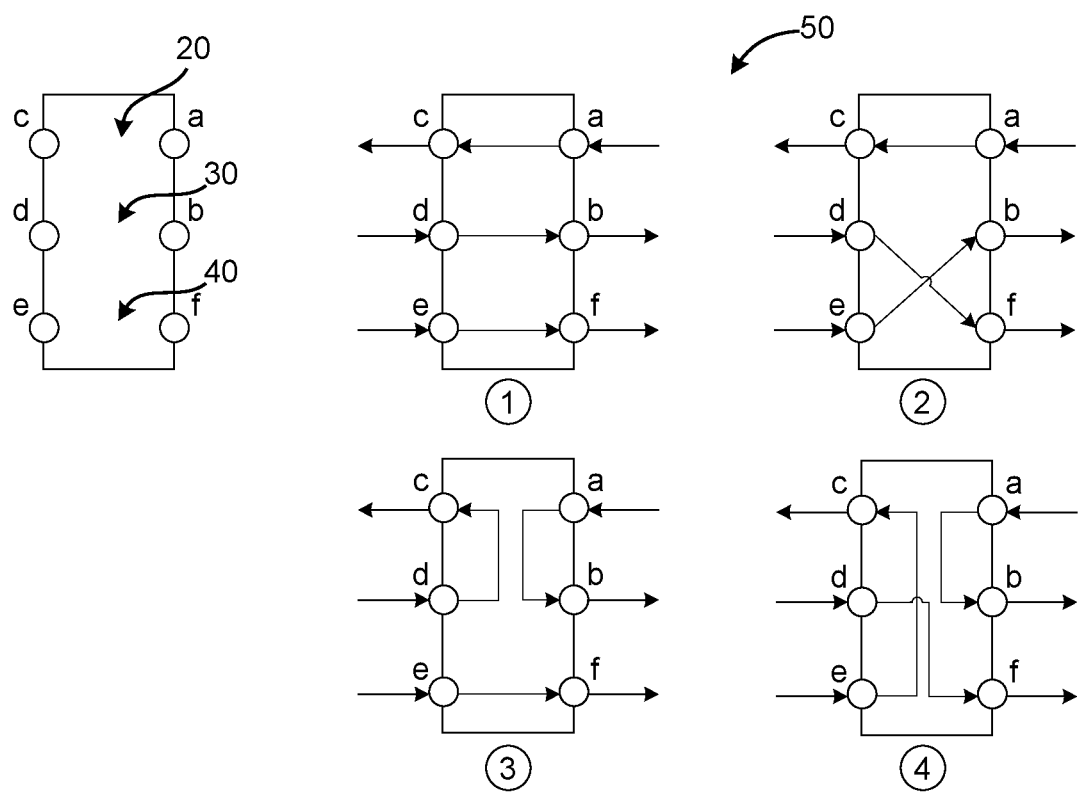
FIG. 2 is a series of schematic diagrams of various modes of operation of the six-port valve assembly with three inlets and three outlets of FIG. 1.

Referring now specifically to FIGS. 1 and 2, in one illustrative embodiment, the six-port valve assembly 50 with three inlets and three outlets includes the cabin thermal management loop 20 generally coupled between inlet a and outlet c, the ESS thermal management loop 30 generally coupled between inlet d and outlet b, and the power electronics thermal management loop 40 generally coupled between inlet e and outlet f. These inlets and outlet connections could, of course, be varied, and are by selective operation of the six-port valve assembly 50. In operation mode 1 illustrated, the three thermal management loops are all isolated from one another, with the cabin thermal management loop 20 still coupled between inlet a and outlet c, the ESS thermal management loop 30 still coupled between inlet d and outlet b, and the power electronics thermal management loop 40 coupled between inlet e and outlet f In operation mode 2 illustrated, the cabin thermal management loop 20 is still isolated from the ESS thermal management loop 30 and the power electronics thermal management loop 40, but the ESS thermal management loop 30 and the power electronics thermal management loop 40 are now interconnected, with the cabin thermal management loop 20 still coupled between inlet a and outlet c, the ESS thermal management loop 30 now coupled between inlet d and outlet f, and the power electronics thermal management loop 40 now coupled between inlet e and outlet b. In operation mode 3 illustrated, the power electronics thermal management loop 40 is still isolated from the cabin thermal management loop 20 and the ESS thermal management loop 30, but the cabin thermal management loop 20 and the ESS thermal management loop 30 are now interconnected, with the cabin thermal management loop 20 now coupled between inlet a and outlet b, the ESS thermal management loop 30 now coupled between inlet d and outlet c, and the power electronics thermal management loop 40 still coupled between inlet e and outlet f. In operation mode 4 illustrated, the cabin thermal management loop 20, the ESS thermal management loop 30, and the power electronics thermal management loop 40 are now all interconnected, with the cabin thermal management loop 20 now coupled between inlet a and outlet b, the ESS thermal management loop 30 now coupled between inlet d and outlet f, and the power electronics thermal management loop 40 now coupled between inlet e and outlet c. Other operation modes are, of course, also possible.

Figure 3:
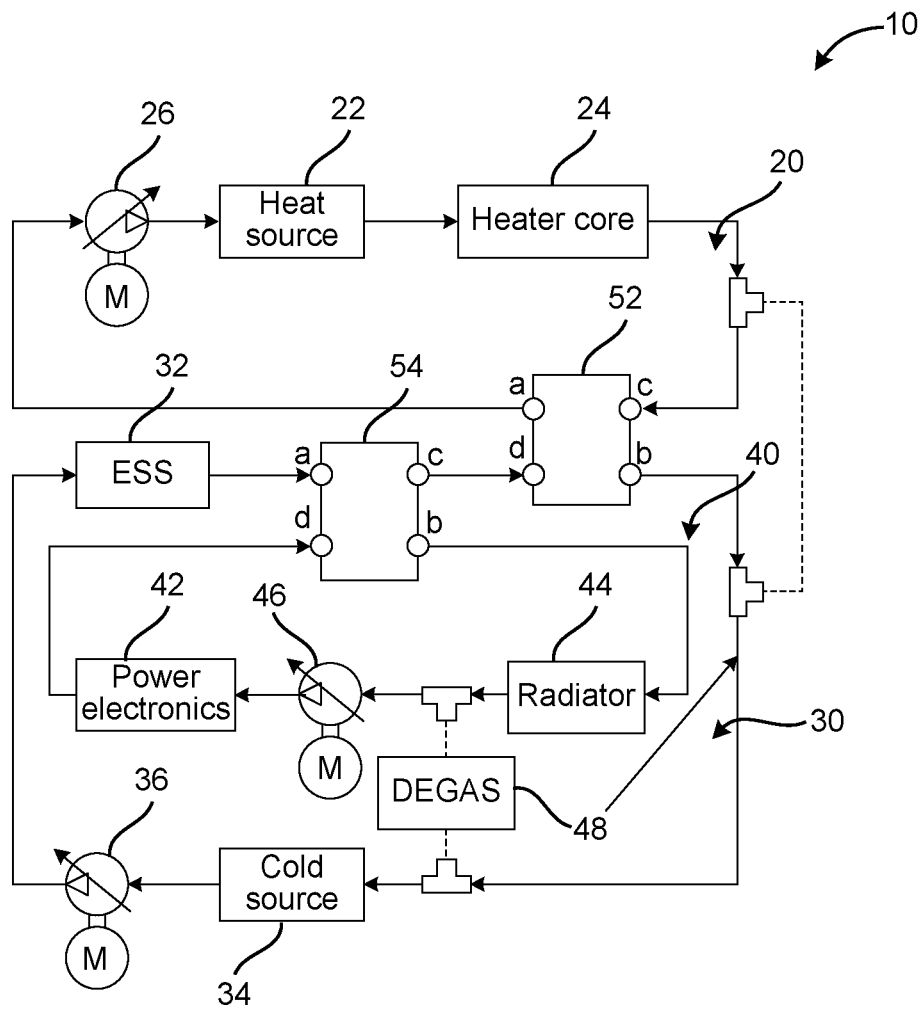
FIG. 3 is a schematic diagram of another illustrative embodiment of the ITMS of the present disclosure, utilizing two four-port valve assemblies each with two inlets and two outlets.

Referring now specifically to FIG. 3, in another illustrative embodiment, the ITMS 10 of the present disclosure again includes three selectively interconnected thermal management loops: a cabin thermal management loop 20, an ESS thermal management loop 30, and a power electronics loop 40. These thermal management loops are selectively interconnected by multiple multi-port valve assemblies 52,54, which here each include a four-port valve assembly with two inlets, a and d, and two outlets, c and b.

Again, the cabin thermal management loop 20 generally includes heating assembly such as a heat source 22, which may include a coolant heater, a water-cooled condenser, a hot thermal storage unit, or a combination of two or more of the aforementioned sources, and a heating assembly such as a heat exchanger 24, which may include a heater core, conventionally associated with an ICE. A pump assembly 26 is also provided. Collectively, the heat source 22, the heat exchanger 24, and the pump assembly 26 are operable for controlling the environment associated with the cabin of a vehicle.

The ESS thermal management loop 30 generally includes the ESS 32, such as a battery or battery pack, and a cold source 34, such as a chiller or cold thermal storage unit. A pump assembly 36 is also provided. Collectively, the ESS 32, the cold source 34, and the pump assembly 36 are operable for controlling the environment associated with the ESS 32.

The power electronics thermal management loop 40 generally includes the power electronics 42, such as motors, inverters/converters, sensors, control systems, and other interface electronics, and a radiator 44, conventionally associated with an ICE. A pump assembly 46 is also provided. Collectively, the power electronics 42, the radiator 44, and the pump assembly 46 are operable for controlling the environment associated with the power electronics 42. A degas assembly 48 includes a degas bottle and associated hoses and tee junctions that provide coolant storage and a deaeration function among the cabin thermal management loop 20, the ESS thermal management loop 30, and the power electronics thermal management loop 40.

Again, these thermal management loops are selectively interconnected by the multiple multi-port valve assemblies 52,54, which here include two four-port valve assemblies each with two inlets, a and d, and two outlets, c and b. These inlets and outlets are selectively enabled/disabled, either by mechanical or electronic means, such as by software, firmware, and/or hardware means. As illustrated, one four-port valve assembly 52 selectively interconnects the cabin thermal management loop 20 with the ESS thermal management loop 30, while the other four-port valve assembly 54 selectively interconnects the ESS thermal management loop 30 with the power electronics thermal management loop 40, thereby selectively interconnecting all three thermal management loops through the two four-port valve assemblies 52,54 linked in series.

Figure 4:
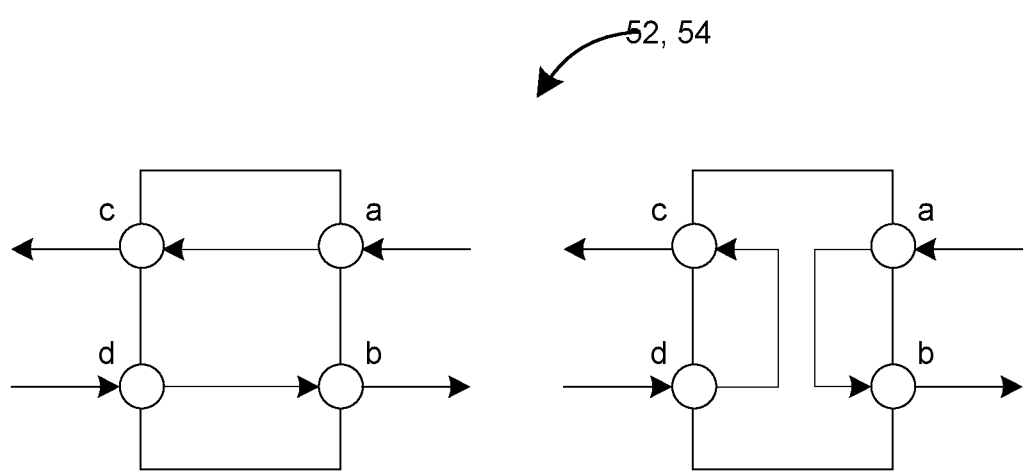
FIG. 4 is a series of schematic diagrams of various modes of operation of the two four-port valve assemblies each with two inlets and two outlets of FIG. 3.

Referring now specifically to FIGS. 3 and 4, in another illustrative embodiment, one of the four-port valve assemblies 52 with two inlets and two outlets includes the cabin thermal management loop 20 generally coupled between inlet a and outlet c and the ESS thermal management loop 30 generally coupled between inlet d and outlet b. These inlets and outlet connections could, of course, be varied, and are by selective operation of the four-port valve assembly 52. The other of the four-port valve assemblies 54 with two inlets and two outlets includes the ESS thermal management loop 30 generally coupled between inlet a and outlet c and the power electronics thermal management loop 40 generally coupled between inlet d and outlet b. These inlets and outlet connections could also, of course, be varied, and are by selective operation of the four-port valve assembly 54. The two valve assemblies 52,54 are coupled via inlet d of the first valve assembly 52 and outlet c of the second valve assembly 54, in the illustrative embodiment provided. In operation, the inlet and outlet ports of both valve assemblies 52,54 can be variably cross-connected to interconnect the various thermal management loops 20,30,40. As illustrated in FIG. 4, by way of example only, inlet a can be coupled to outlet b, while inlet d can be coupled to outlet c.

Figure 5:
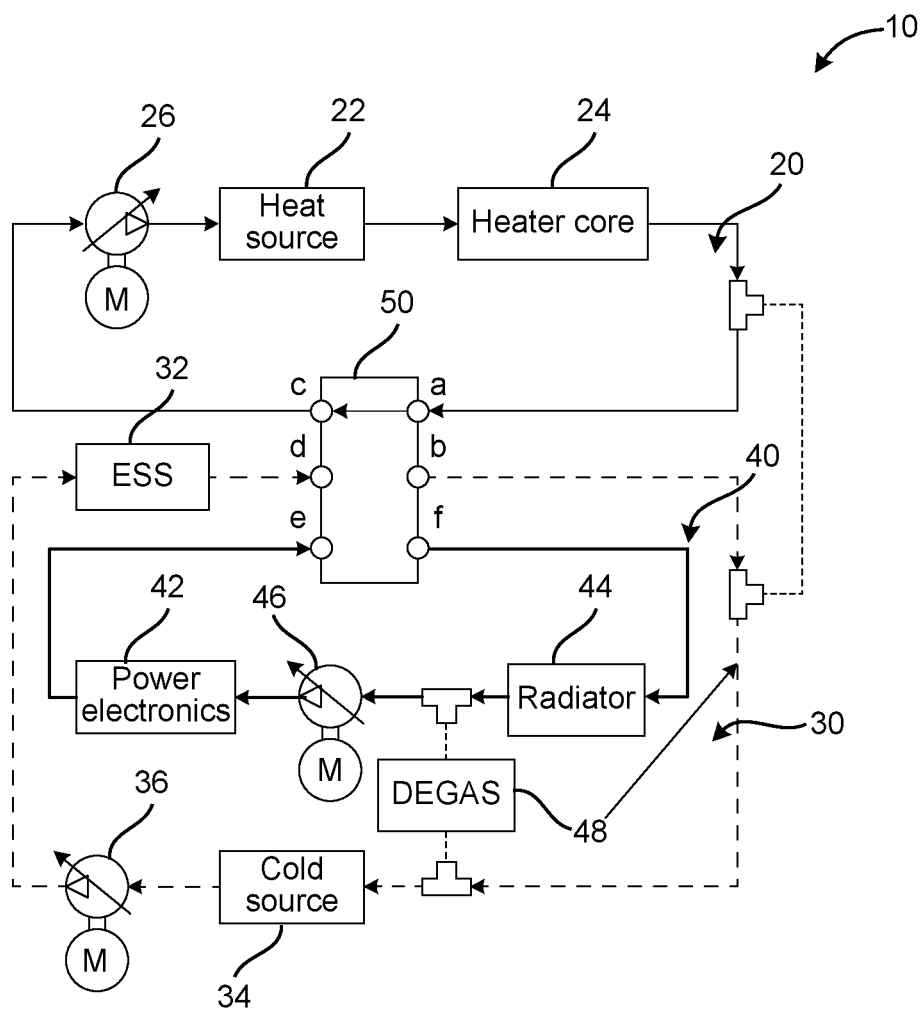
FIG. 5 is a schematic diagram illustrating an isolation mode of operation of the ITMS of the present disclosure.

Referring now specifically to FIG. 5, in an isolation mode of operation of the ITMS 10, each of the cabin thermal management loop 20, the ESS thermal management loop 30, and the power electronics thermal management loop 40 are isolated from one another via appropriate actuation of the multi-port valve assembly 50, which prohibits interconnection. Here, in the vehicle, the cabin heating may be on or off, by turning on or off the heat source 22 and pump assembly 26, depending upon the occupant heating request. The ESS 32 is in either a self-circulation mode for temperature equalization, with the cold source 34 off, or in an active cooling mode, with the cold source 34 on. The power electronics 42 are cooled by the radiator 44.

Figure 6:
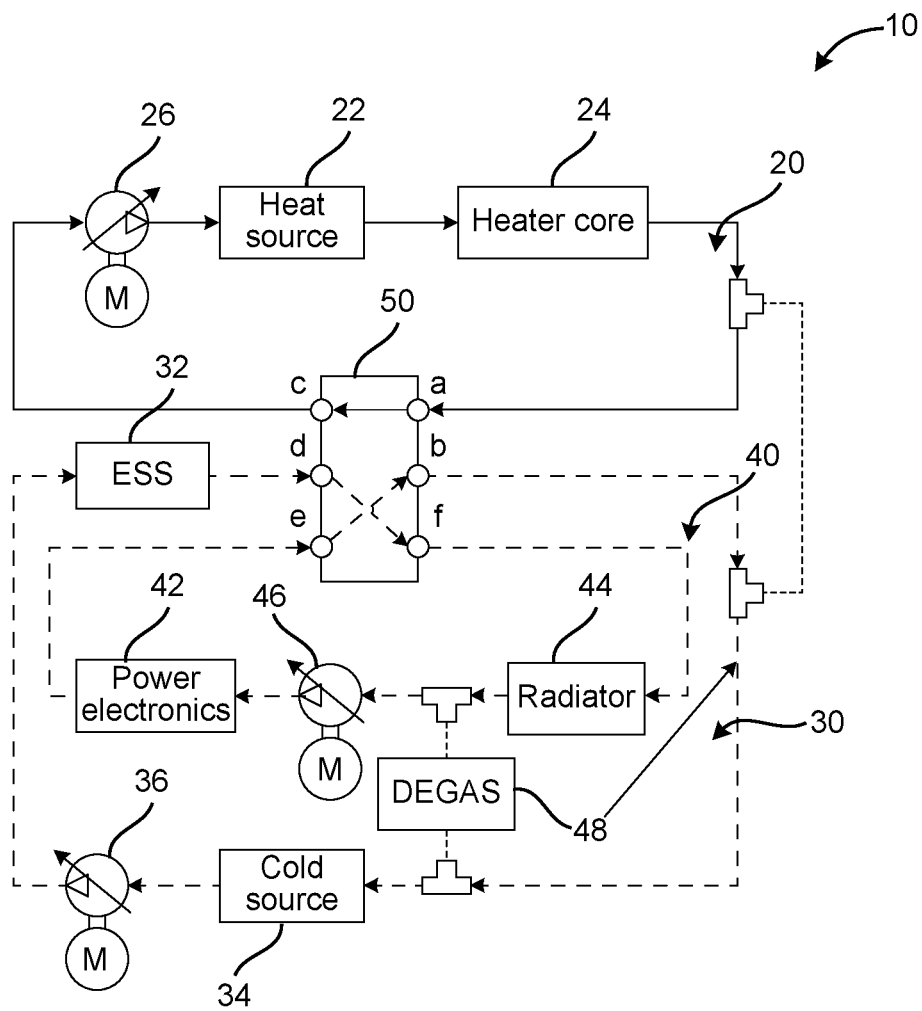
FIG. 6 is a schematic diagram illustrating an ESS/power electronics interconnection mode of operation of the ITMS of the present disclosure.

Referring now specifically to FIG. 6, in an ESS/power electronics interconnection mode of operation of the ITMS 10, the ESS thermal management loop 30 and the power electronics thermal management loop 40 are interconnected with one another, but isolated from the cabin thermal management loop 20, via appropriate actuation of the multi-port valve assembly 50, which selectively prohibits interconnection. Here, in the vehicle, the cabin heating may be on or off, by turning on or off the heat source 22 and pump assembly 26, depending upon the occupant heating request. The ESS 32 and the power electronics may be cooled by the radiator 44, with the active grille shutter (AGS) open, or waste heat may be recovered from the ESS 32 and the power electronics 42 via the cold source 34, with the AGS closed, depending upon the mode of operation.

Figure 7:
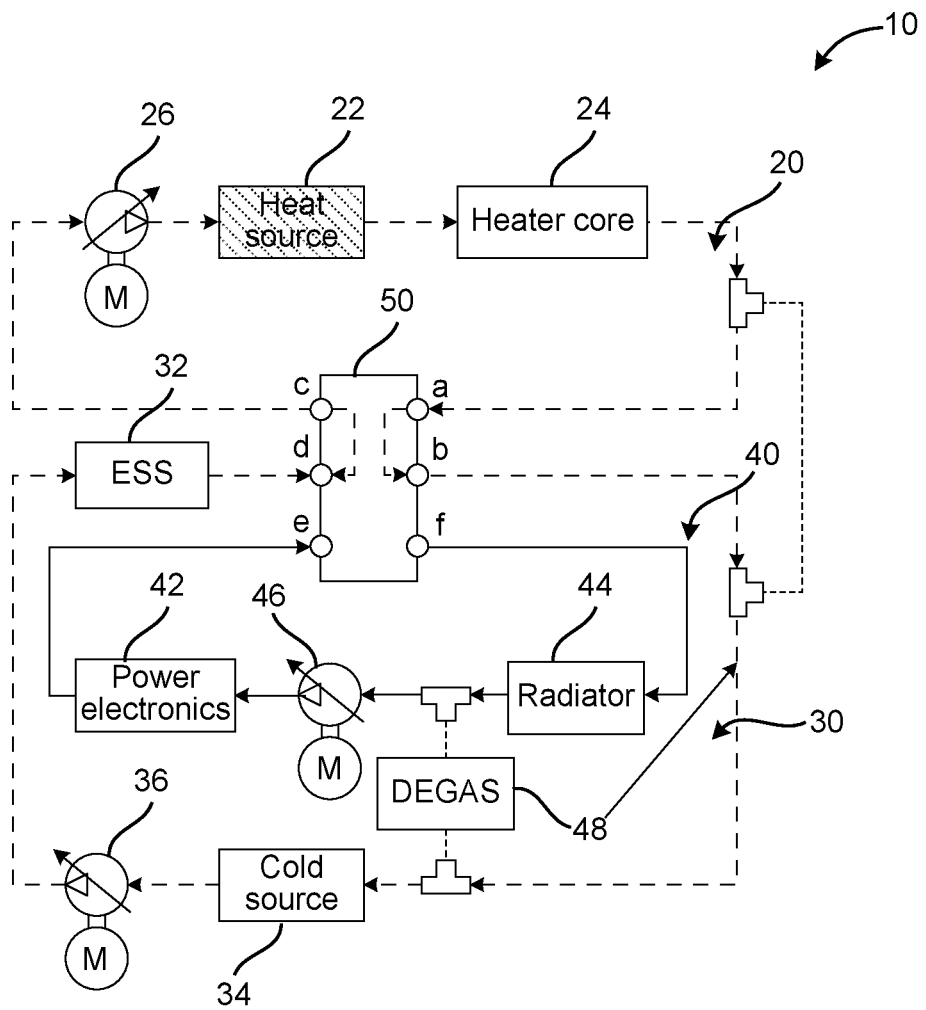
FIG. 7 is a schematic diagram illustrating a cabin/ESS interconnection mode of operation of the ITMS of the present disclosure.

Referring now specifically to FIG. 7, in a cabin/ESS interconnection mode of operation of the ITMS 10, the cabin thermal management loop 20 and the ESS thermal management loop 30 are interconnected with one another, but isolated from the power electronics thermal management loop 40, via appropriate actuation of the multi-port valve assembly 50, which selectively prohibits interconnection. This mode may be activated for preconditioning of the ESS 32 alone, or for preconditioning of the both the cabin and the ESS 32, utilizing heat from the heat source 22.

Figure 8:
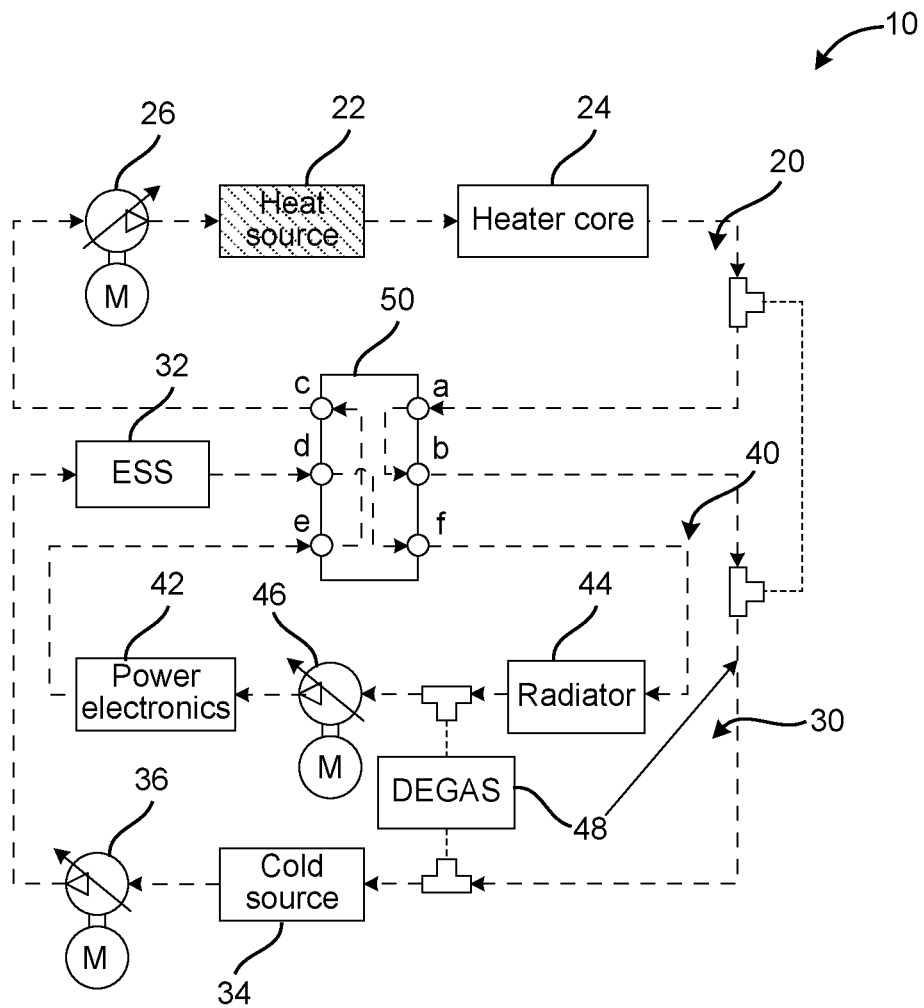
FIG. 8 is a schematic diagram illustrating a cabin/ESS/power electronics interconnection mode of operation of the ITMS of the present disclosure.

Referring now specifically to FIG. 8, in a cabin/ESS/power electronics interconnection mode of operation of the ITMS 10, the cabin thermal management loop 20, the ESS thermal management loop 30, and the power electronics thermal management loop 40 are interconnected with one another via appropriate actuation of the multi-port valve assembly 50, which selectively enables interconnection. This mode may be activated for preconditioning of the ESS 32 alone, or for preconditioning of the both the cabin and the ESS 32, now utilizing heat from the heat source 22 plus possibly waste heat from the power electronics 42.

Figure 9:
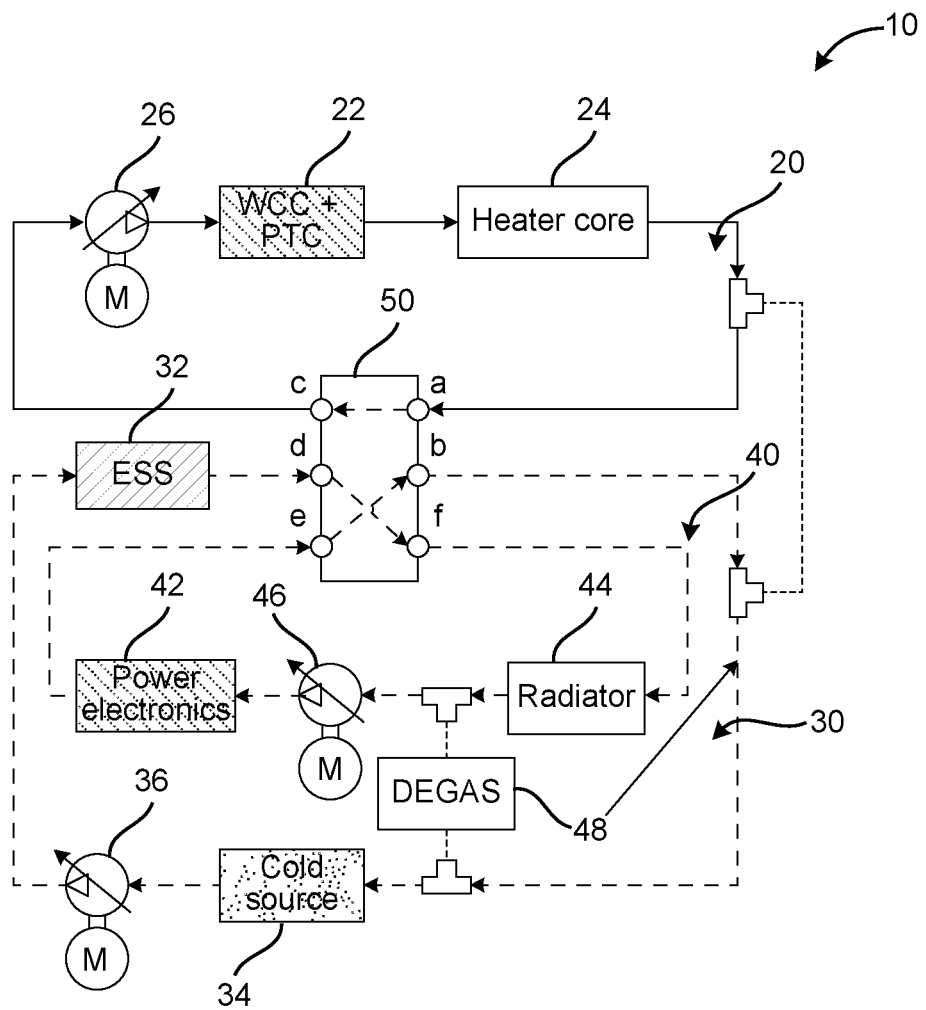
FIG. 9 is a schematic diagram illustrating one embodiment of the cabin/ESS/power electronics interconnection mode of operation of the ITMS of the present disclosure.
Figure 10:
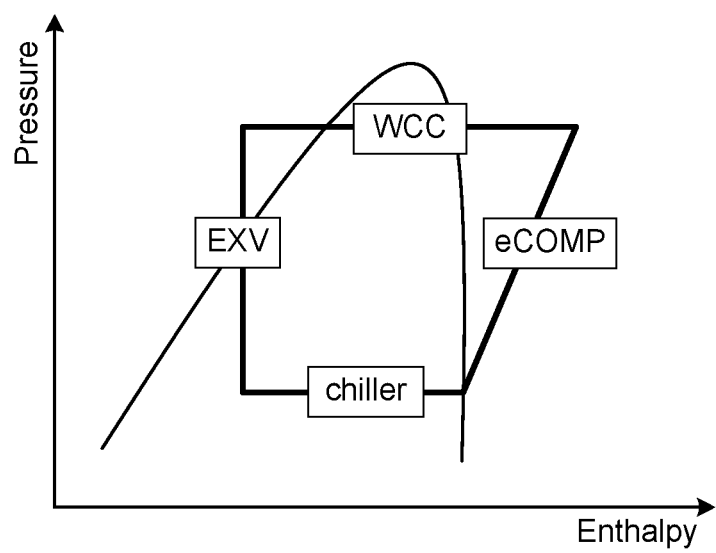
FIG. 10 is a thermodynamic diagram of pressure versus enthalpy associated with the embodiment of the cabin/ESS/power electronics interconnection mode of operation of FIG. 9.

Referring now specifically to FIG. 9, in one embodiment of the cabin/ESS/power electronics interconnection mode of operation of the ITMS 10, the cabin thermal management loop 20, the ESS thermal management loop 30, and the power electronics thermal management loop 40 are again interconnected with one another via appropriate actuation of the multi-port valve assembly 50, which selectively enables interconnection. Here, the cold source 34 includes at least a chiller, the hot source 22 includes at least a water-cooled condenser (WCC) and a positive temperature coefficient (PTC) electrical heater, and the ITMS 10 is part of a heat pump system (note, the refrigerant side is omitted for simplicity). The low-grade heat from the power electronics 42 is absorbed via the chiller 34, converted into a high-grade heat via compressor work, and rejected via WCC to the coolant circuit. The refrigerant cycle is illustrated in the thermodynamic diagram of pressure versus enthalpy in FIG. 10. As this process continues, the coolant temperature rises, the refrigerant-side pressure in the chiller elevates, and the compressor power input increases, which in turn yields more heat output in WCC. The heating capacity therefore increases exponentially. The PTC heater and/or power electronics may be engaged to further increase the heating capacity. This mode is particularly useful for max heat load conditions, for example cold startup of EVs below −20 degree Celsius, to reduce battery and/or cabin preconditioning time and improve charging rate.

Figure 11:
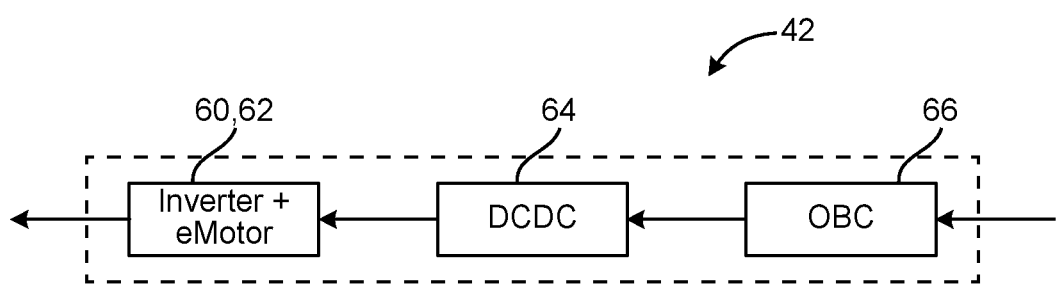
FIG. 11 is a schematic diagram of one illustrative embodiment of the power electronics circuit of the present disclosure.

FIG. 11 is a schematic diagram of one illustrative embodiment of the power electronics circuit 42 of the present disclosure. Here, the power electronics circuit 42 includes an integrated inverter 60 and traction motor 62 coupled to a DC/DC converter 64 coupled to an onboard charger (OBC) 66.

Figure 12:
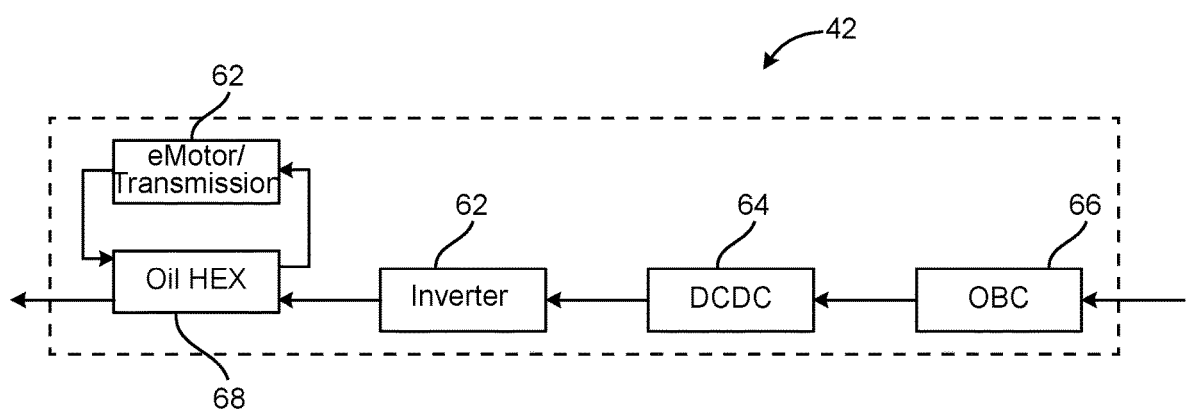
FIG. 12 is a schematic diagram of another illustrative embodiment of the power electronics circuit of the present disclosure.

FIG. 12 is a schematic diagram of another illustrative embodiment of the power electronics circuit 42 of the present disclosure. Here, the power electronics circuit 42 includes a separate inverter 60 and traction motor/transmission 62 coupled to the DC/DC converter 64 coupled to the OBC 66. The inverter 60 and motor/transmission 62 are each coupled to an oil heat exchanger 68.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Figure 13:
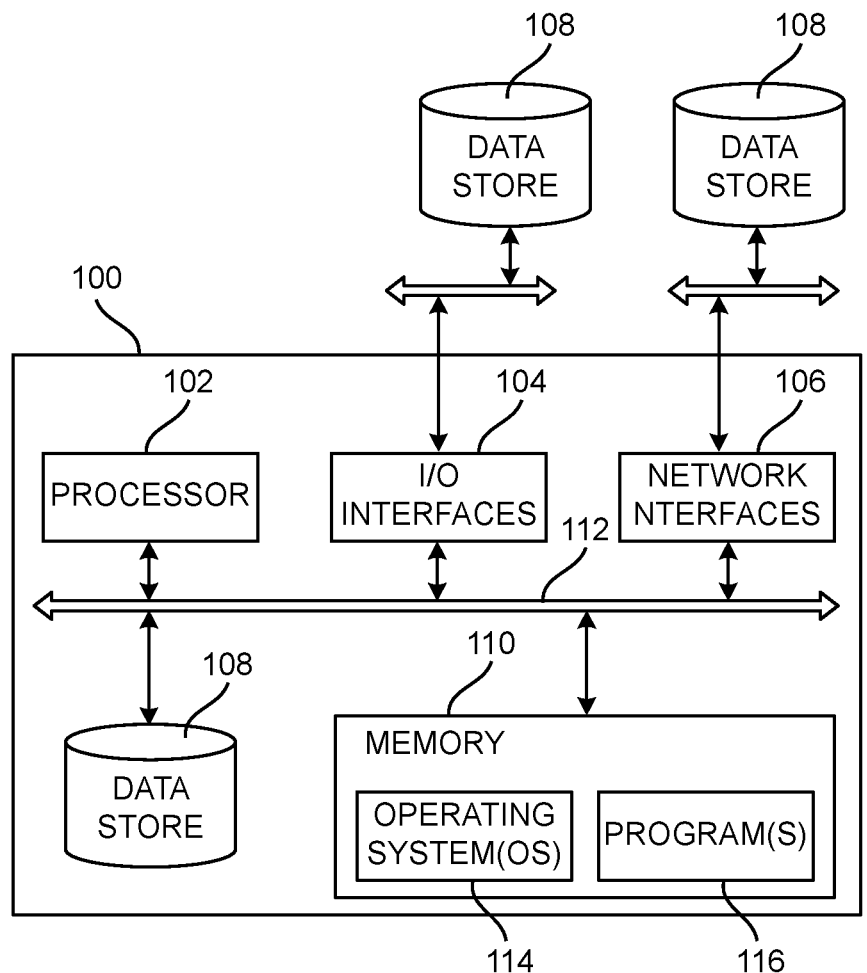
FIG. 13 is a block diagram of a control system that may be used in conjunction with the ITMS of the present disclosure.

FIG. 13 illustrates a control system 100 that may be used to direct operation of the ITMS and valve assembly or assemblies of the present disclosure, including a processor 102. The processor 102 is a hardware device for executing software instructions embodied in a non-transitory computer-readable medium. The processor 102 may be any custom made or commercially available processor, a central processing unit (CPU), an auxiliary processor among several processors associated with a server, a semiconductor-based microprocessor (in the form of a microchip or chipset), or generally any device for executing software instructions. When the control system 100 is in operation, the processor 102 is configured to execute software stored within the memory 110, to communicate data to and from the memory 110, and to generally control operations of the control system 100 pursuant to the software instructions. I/O interfaces 104 may be used to receive user input from and/or for providing system output to one or more devices or components.

A network interface 106 may be used to enable the control system 100 to communicate on a network, such as the Internet or a Local Area Network (LAN). The network interface 106 may include, for example, an Ethernet card or adapter (e.g., 10BaseT, Fast Ethernet, Gigabit Ethernet, or 10 GbE) or a Wireless Local Area Network (WLAN) card or adapter (e.g., 802.11a/b/g/n/ac). The network interface 106 may include address, control, and/or data connections to enable appropriate communications on the network. A data store 108 may be used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media. In one example, the data store 108 may be located internal to the control system 100, such as, for example, an internal hard drive connected to the local interface 112 in the control system 100. Additionally, in another embodiment, the data store 108 may be located external to the control system 100 such as, for example, an external hard drive connected to the I/O interfaces 104 (e.g., a SCSI or USB connection). In a further embodiment, the data store 108 may be connected to the control system 100 through a network, such as, for example, a network-attached file server.

The memory 110 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 110 may incorporate electronic, magnetic, optical, and/or other types of storage media. Note that the memory 110 may have a distributed architecture, where various components are situated remotely from one another but can be accessed by the processor 102. The software in memory 110 may include one or more software programs, each of which includes an ordered listing of executable instructions for implementing logical functions. The software in the memory 110 includes a suitable operating system (O/S) 114 and one or more programs 116. The operating system 114 essentially controls the execution of other computer programs, such as the one or more programs 116, and provides scheduling, input-output control, file and data management, memory management, and communication control and related services. The one or more programs 116 may be configured to implement the various processes, algorithms, methods, techniques, etc. described herein.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure is illustrated and described with reference to illustrative embodiments and examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. An integrated thermal management system for a vehicle, comprising:
    a cabin thermal management loop;
    an energy storage system thermal management loop;
    a power electronics thermal management loop; and
    a multi-port valve assembly having an inlet port and an outlet port for the cabin thermal management loop, an inlet port and an outlet port for the energy storage system thermal management loop, and an inlet port and an outlet port for the power electronics thermal management loop, the multi-port valve assembly operable in multiple modes to directly couple each of the inlet ports to a corresponding one of the outlet ports within the multi-port valve assembly in a one-to-one direct coupling, wherein:
        the multi-port valve assembly, responsive to an operating state of the vehicle, directly couples each of the inlet ports to a corresponding one of the outlet ports within the multi-port valve assembly; and
        in one mode of the multiple modes, the multi-port valve assembly directly couples each of the inlet ports to a corresponding one of the outlet ports within the multi-port valve assembly to isolate each of the cabin thermal management loop, the energy storage system thermal management loop, and the power electronics thermal management loop from one another.

2. The integrated thermal management system of claim 1, wherein the cabin thermal management loop comprises one or more heating assemblies chosen from a heat source affecting a temperature within a cabin of the vehicle and a heater core affecting the temperature within the cabin of the vehicle.

3. The integrated thermal management system of claim 1, wherein the energy storage system thermal management loop comprises an energy storage system and a cold source affecting a temperature of the energy storage system.

4. The integrated thermal management system of claim 1, wherein the power electronics thermal management loop comprises power electronics and a radiator affecting a temperature of the power electronics.

5. The integrated thermal management system of claim 1, wherein the one mode of the multiple modes is a first mode and the multiple modes comprise:
    the first mode;
    a second mode isolating the cabin thermal management loop and coupling the energy storage system thermal management loop and the power electronics thermal management loop to one another;
    a third mode coupling the cabin thermal management loop and the energy storage system thermal management loop to one another and isolating the power electronics thermal management loop; and
    a fourth mode coupling the cabin thermal management loop, the energy storage system thermal management loop, and the power electronics thermal management loop to one another.

6. The integrated thermal management system of claim 1, wherein the multi-port valve assembly, responsive to the operating state of the vehicle, directly couples each of the inlet ports to a corresponding one of the outlet ports within the multi-port valve assembly to selectively couple the cabin thermal management loop, the energy storage system thermal management loop, and the power electronics thermal management loop to one another or to selectively isolate at least some loops of the cabin thermal management loop, the energy storage system thermal management loop, and the power electronics thermal management loop from one another.

7. An integrated thermal management method for a vehicle, comprising:
    receiving an operating state of the vehicle;
    responsive to the operating state of the vehicle, using a multi-port valve assembly having an inlet port and an outlet port for a cabin thermal management loop of the vehicle, an inlet port and an outlet port for an energy storage system thermal management loop of the vehicle, and an inlet port and an outlet port for a power electronics thermal management loop of the vehicle, the multi-port valve assembly operable in multiple modes to directly couple each of the inlet ports to a corresponding one of the outlet ports within the multi-port valve assembly in a one-to-one direct coupling, to directly couple each of the inlet ports to a corresponding one of the outlet ports within the multi-port valve assembly; and
    responsive to the operating state of the vehicle, in one mode of the multiple modes, the multi-port valve assembly directly couples each of the inlet ports to a corresponding one of the outlet ports within the multi-port valve assembly to isolate each of the cabin thermal management loop, the energy storage system thermal management loop, and the power electronics thermal management loop from one another.

8. The integrated thermal management method of claim 7, wherein the cabin thermal management loop comprises one or more heating assemblies chosen from a heat source affecting a temperature within a cabin of the vehicle and a heater core affecting the temperature within the cabin of the vehicle.

9. The integrated thermal management method of claim 7, wherein the energy storage system thermal management loop comprises an energy storage system and a cold source affecting a temperature of the energy storage system.

10. The integrated thermal management method of claim 7, wherein the power electronics thermal management loop comprises power electronics and a radiator affecting a temperature of the power electronics.

11. The integrated thermal management method of claim 7, wherein the one mode of the multiple modes is a first mode and the multiple modes comprise:
the first mode;
a second mode isolating the cabin thermal management loop and coupling the energy storage system thermal management loop and the power electronics thermal management loop to one another;
a third mode coupling the cabin thermal management loop and the energy storage system thermal management loop to one another and isolating the power electronics thermal management loop; and
a fourth mode coupling the cabin thermal management loop, the energy storage system thermal management loop, and the power electronics thermal management loop to one another.

12. The integrated thermal management method of claim 7, further comprising responsive to the operating state of the vehicle, using the multi-port valve assembly to directly couple each of the inlet ports to a corresponding one of the outlet ports within the multi-port valve assembly to selectively couple the cabin thermal management loop, the energy storage system thermal management loop, and the power electronics thermal management loop to one another or to selectively isolate at least some loops of the cabin thermal management loop, the energy storage system thermal management loop, and the power electronics thermal management loop from one another.

13. A non-transitory computer readable medium stored in a memory and executable by a processor to carry out integrated thermal management method steps, comprising:
receiving an operating state of a vehicle;
responsive to the operating state of the vehicle, using a multi-port valve assembly having an inlet port and an outlet port for a cabin thermal management loop of the vehicle, an inlet port and an outlet port for an energy storage system thermal management loop of the vehicle, and an inlet port and an outlet port for a power electronics thermal management loop of the vehicle, the multi-port valve assembly operable in multiple modes to directly couple each of the inlet ports to a corresponding one of the outlet ports within the multi-port valve assembly in a one-to-one direct coupling, to directly couple each of the inlet ports to a corresponding one of the outlet ports within the multi-port valve assembly; and
responsive to the operating state of the vehicle, in one mode of the multiple modes, the multi-port valve assembly directly couples each of the inlet ports to a corresponding one of the outlet ports within the multi-port valve assembly to isolate each of the cabin thermal management loop, the energy storage system thermal management loop, and the power electronics thermal management loop from one another.

14. The non-transitory computer-readable medium of claim 13, wherein the cabin thermal management loop comprises one or more heating assemblies chosen from a heat source affecting a temperature within a cabin of the vehicle and a heater core affecting the temperature within the cabin of the vehicle.

15. The non-transitory computer-readable medium of claim 13, wherein the energy storage system thermal management loop comprises an energy storage system and a cold source affecting a temperature of the energy storage system.

16. The non-transitory computer-readable medium of claim 13, wherein the power electronics thermal management loop comprises power electronics and a radiator affecting a temperature of the power electronics.

17. The non-transitory computer-readable medium of claim 13, wherein the multi-port valve assembly comprises one of a single six-port valve assembly comprising three inlet ports and three outlet ports and a pair of four-port valve assemblies each comprising two inlet ports and two outlet ports.

18. The non-transitory computer-readable medium of claim 13, wherein the one mode of the multiple modes is a first mode and the multiple modes comprise:
the first mode;
a second mode isolating the cabin thermal management loop and coupling the energy storage system thermal management loop and the power electronics thermal management loop to one another;
a third mode coupling the cabin thermal management loop and the energy storage system thermal management loop to one another and isolating the power electronics thermal management loop; and
a fourth mode coupling the cabin thermal management loop, the energy storage system thermal management loop, and the power electronics thermal management loop to one another.

* * * * *